United States Patent
Baldwin et al.

(10) Patent No.: US 6,859,020 B2
(45) Date of Patent: Feb. 22, 2005

(54) LOW POWER MODE DETECTION CIRCUIT FOR A DC/DC CONVERTER

(75) Inventors: David J. Baldwin, Allen, TX (US); James A. Kohout, Dallas, TX (US)

(73) Assignee: Texas Instruments Incorporated, Dallas, TX (US)

(*) Notice: Subject to any disclaimer, the term of this patent is extended or adjusted under 35 U.S.C. 154(b) by 71 days.

(21) Appl. No.: 10/270,921

(22) Filed: Oct. 15, 2002

(65) Prior Publication Data

US 2004/0070378 A1 Apr. 15, 2004

(51) Int. Cl.[7] .................................................. G05F 1/44
(52) U.S. Cl. ........................ 323/283; 323/222; 323/224
(58) Field of Search ................................ 323/223, 222, 323/225, 259, 282, 283, 284

(56) References Cited

U.S. PATENT DOCUMENTS

| | | | |
|---|---|---|---|
| 5,481,178 A | | 1/1996 | Wilcox et al. |
| 5,920,475 A | * | 7/1999 | Boylan et al. ............... 363/127 |
| 6,166,527 A | * | 12/2000 | Dwelley et al. ............ 323/222 |
| 6,307,356 B1 | * | 10/2001 | Dwelley ...................... 323/282 |
| 6,414,403 B2 | * | 7/2002 | Kitagawa et al. ............. 307/66 |
| 6,437,549 B1 | * | 8/2002 | Takagishi .................... 323/282 |

\* cited by examiner

*Primary Examiner*—Gary L. Laxton
(74) *Attorney, Agent, or Firm*—William B. Kempler; W. James Brady, III; Frederick J. Telecky, Jr.

(57) ABSTRACT

A DC/DC converter has a semiconductor switch coupled to an inductor, a capacitor and a rectifier. A comparator is coupled to across the rectifier to detect a polarity reversal during the second portion of converter operation to place the converter in a low power mode if the voltage across the rectifier is of an appropriate polarity for reverse current flow. The rectifier may be a synchronous rectifier transistor and the voltage converter placed in a low power mode when the polarity across the synchronous rectifier indicates that reverse current flow is possible. A timing circuit delays the generation of the control signal to place the converter in a low power mode until the steady state current is below a predetermined threshold for a predetermined amount of time. The synchronous rectifier may be turned OFF when the current through the converter falls below another predetermined threshold value and the voltage across the synchronous rectifier will become the voltage across the parasitic diode of the FET synchronous rectifier.

17 Claims, 4 Drawing Sheets

LOW POWER MODE DETECTION CIRCUIT FOR A DC/DC CONVERTER

CROSS REFERENCE TO RELATED APPLICATIONS

This application is related to co-pending application Ser. No. 10/271,016 filed on even date, which is incorporated herein by reference.

FIELD OF THE INVENTION

This invention relates to a DC/DC switching regulator and more specifically to a DC/DC switching regulator for an automobile instrument cluster.

BACKGROUND OF THE INVENTION

DC/DC switching regulators or converters are part of many power management systems because of the improved power conversion efficiency provided by these regulators over that of linear regulators. Switching regulator designs can achieve efficiencies as high as 90% or more where as the efficiency of linear regulators is dependent strictly upon the difference between the input voltage and the output voltage. DC/DC switching regulators can take the form of a buck or voltage reducing regulator, a boost converter, which increases the input voltage, or a buck/boost converter, which can perform both functions.

It has now become common place for active loads to enter reduced power or "sleep" modes in which portions of the circuit not currently necessary for operation are shut off in order to conserve power. These power management techniques allow battery power devices to run for much longer periods time on the same charge. They are also useful in devices powered from the power mains as a way of reducing both the energy consumed by the device and the heat generated thereby. When DC/DC converters are operating at their normal load current, the average current through the inductor is continuous in order to supply this current to the load. However, should the current fall below a threshold value, the current through the inductor will go to zero during some portion of the converter cycle. This is known in the art as "discontinuous mode" operation because the current through the inductor is no longer continuous. At this point, it is generally pointless to operate the DC/DC converter as the amount of power needed to operate the converter greatly exceeds that consumed by the load. The converter may be shut down at this time and the load supplied by the output capacitor until the voltage falls below a predetermined threshold value or a predetermined amount of time has elapsed.

Circuits for detecting the discontinuous operation of a DC/DC converter are known in the art. For example, in the U.S. Pat. No. 5,481,178, a circuit for controlling a switching regulator is shown in an inductor designed to have a current tap or a series resistor is utilized to detect the current flow in the converter. When the current falls below a predetermined threshold, the system is placed in a low power mode. One disadvantage to this technique is that the inductor must be especially manufactured to have the current tap formed therein. Thus standard devices can not be utilized. In the embodiment in which a resistor is utilized, the power dissipated in the resistor reduces the efficiency of the regulator. Both techniques suffer from the disadvantage that additional pins are required on the integrated circuit containing the rest of the regulator circuitry which increases the cost of the integrated circuit.

It is also known in the art to measure the voltage across a synchronous rectifier in a DC/DC converter and turn the synchronous rectifier OFF if reverse current flow is detected. Measuring the voltage across the synchronous detector transistor requires a more expensive comparator having a low offset unless the ON resistance of the synchronous rectifier is made high enough to generate a voltage that exceeds the offset of the comparator. The former technique increases the cost whereas the latter technique decreases the efficiency of the converter.

SUMMARY OF THE INVENTION

It is a general object of the present invention to provide a circuit for determining that a DC/DC converter or regulator should be placed in a low power mode.

Another object an embodiment of the invention is a circuit for determining that a DC/DC converter or regulator should be placed in a lower power mode in which the determining circuit does not require external detection devices or additional pins on the integrated circuit.

These and other objects are achieved, in accordance with one aspect of the invention by a voltage converter having a semiconductor switch coupled to an inductor, a capacitor and a rectifier, the voltage across the capacitor being an output voltage. A control circuit placing the voltage converter in a reduced power mode has a voltage detector circuit coupled across the rectifier detecting polarity of a voltage across the rectifier and generates a control signal to place the voltage converter in a low power mode when the polarity of the voltage across the rectifier is an appropriate polarity for reverse current flow.

Another aspect of the invention includes a DC/DC converter for generating a voltage at an output which is lower than a voltage supplied to an input. A NMOS transistor is coupled between the voltage supply and the series connection of an inductor and a capacitor, the voltage across the capacitor being the output voltage. A NMOS synchronous rectifier transistor is connected in parallel to the series connected inductor and capacitor, and the synchronous rectifier has a parasitic diode coupled in parallel thereto. A control circuit is coupled to the NMOS transistor and the NMOS synchronous rectifier transistor and provides a drive signal between substantially the supply voltage and substantially a reference voltage. A voltage detector circuit is coupled across the NMOS synchronous rectifier transistor detecting the polarity of a voltage across the NMOS synchronous rectifier transistor and generating a control signal to place the converter in a low power mode when the polarity across the synchronous rectifier indicates that reverse current flow is possible.

A third aspect of the invention includes a method for operating a voltage converter having a semiconductor switch coupled to an inductor, a capacitor and a rectifier. The voltage polarity across the rectifier is detected and compared to the polarity at full load. A control signal is generated if the polarity detected is opposite the polarity at full load, and the converter is placed in a low power mode.

A further aspect of the invention comprises a voltage converter having a first switching transistor coupled to a first voltage supply, an inductor, and a capacitor, the voltage across the capacitor being the output voltage. A rectifier is coupled to the inductor to allow the magnetic field of the inductor to collapse and charge the capacitor. A voltage comparator is coupled across the rectifier and detects a polarity of voltage across the rectifier. A control circuit is responsive to an output of the voltage comparator indicative of a polarity reversal across the rectifier during the decay of the inductor magnetic field, to generate a control signal which places the voltage converter in a low power mode.

DETAILED DESCRIPTION OF THE PRESENT INVENTION

Figure 1:
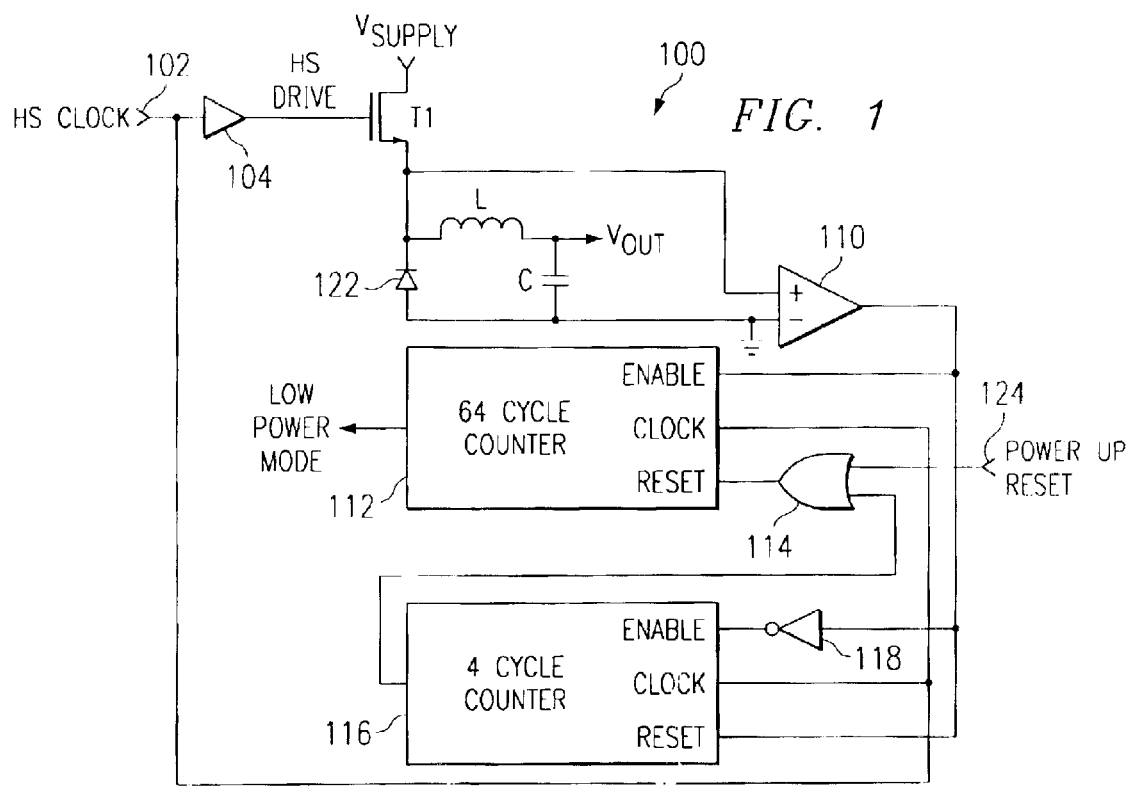
FIG. 1 is a schematic block diagram of a first embodiment of the invention as applied to a buck DC/DC converter.

Referring to FIG. 1, a schematic block diagram of a buck DC/DC is generally shown as 100. The switching regulator 100 utilizes a conventional configuration including a first switching transistor T1 coupled between a power $V_{supply}$ and a reverse biased diode 122 to ground. An inductor L has a first terminal coupled to the node between the switching transistor T1 and the diode 122 and having a second terminal which is the output voltage of the switching regulator. A capacitor C is coupled between the second terminal of the inductor L and ground. The switching transistor T1 is driven by a clock signal labeled HS clock at terminal 102 and a driver 104. The output of the driver 104 is labeled as the signal HS drive. Not illustrated in the drawing for simplicity in illustration and to enhance the understanding of the present invention, is a feedback circuit from the output of the regulator to control the switching of transistor T1 in order to regulate the output voltage. These feedback control circuits are well known in the art.

In operation, switching transistor T1 is switched by the HS clock signal on terminal 102 via driver 104 to generate voltage pulses which are applied to the low pass filter formed by inductor L and capacitor C. These pulses are averaged by the low pass filter to produce a lower voltage at terminal $V_{out}$. When transistor T1 turns OFF, the magnetic field formed in inductor L will collapse causing a voltage reversal across the inductor in order to try to maintain the current flow. A diode 122, commonly known as a "free wheeling diode", is utilized to provide a current path to allow the energy in the inductor to charge the capacitor. The average current through the inductor L remains positive as long as the current exceeds a threshold value. Thus, either transistor T1 or diode 122 will be conducting. Therefore, during the second portion of the cycle in which transistor T1 is OFF, the voltage across diode 122 will be negative as the diode will be forward biased by ground potential.

In the event that the circuitry being driven by the regulator goes into a "sleep" mode, the current drawn through the inductor will be much less than the full load current that the regulator needs to supply when the circuit is operating, and in some cases may be several orders of magnitude lower than the full load current. Under such circumstances, the current through inductor L will be lower than the threshold and the regulator will enter the "discontinuous mode" in which the current through the inductor goes to zero at some point during the cycle. Diode 122 will not be forward biased and the voltage across capacitor C will try to force current in the reverse direction through the inductor to ground. This current flow is blocked by diode 122.

The voltage that appears across diode 122 is substantially the voltage across capacitor C, since the reverse current through diode 122 can be neglected and thus there are no losses in the inductor L. The appearance of the positive voltage across diode 122 during the second half of the cycle can be utilized as a signal that the regulator should be placed in a low power mode. In the illustrated embodiment, the regulator does not enter the low power mode unless there is a positive voltage across diode 122 for 64 cycles. The diode voltage is detected by a voltage detector or comparator 110 coupled across the diode 122. The non-inverting terminal of the comparator 110 is connected at the node between switching transistor T1 and diode 122 and the inverting input is coupled to ground. The output of the comparator 110 is coupled to the enable input of a 64-cycle counter 112 and via inverter 118 to enable of a 4-cycle counter 116. The output of comparator 110 is also coupled directly to the reset input of the 4-cycle counter 116. The output of the 4-cycle counter is coupled via OR gate 114 into the reset input of the 64-cycle counter 112. The clock inputs to both counters are coupled to terminal 102 to receive HS clock signal that is used to switch transistor T1. The other input of 2 input OR gate 114 is coupled to terminal 124 to receive a power up reset signal which resets the counter upon power up of the device. Counters 112 and 116 are triggered on the rising edge of the HS clock signal if the enable input is high. Thus, if there is a positive voltage across diode 122 at the end of the second half of the cycle, counter 112 will be enabled and counter 116 will be disabled. The rising edge of the clock signal will advance the counter by one count until the counter has counted from 0 to 63 to produce a 64 count. If during the rising edge of the HS clock, the output of the comparator is low indicating that the low current condition did not exist for that cycle, 4-cycle counter 116 will be enabled and the clock will advance the 4-cycle counter by 1 count. At the end of 4 clock cycles, the output of the counter 116 will reset 64-cycle counter 112 via OR gate 114. If a period of 64 clock cycles passes in which the second half of the cycles have a positive voltage across the diode 122 without four consecutive negative voltage counts, an output signal will be generated by the 64-cycle counter 112 which will be a low power mode signal that is used to place the regulator in a low power mode. In one embodiment of the low power mode, for example, the regulator will be shut OFF and the load will be supplied by the output capacitor C until either the voltage on the capacitor C drops below a threshold, or a predetermined time has elapsed.

Figure 2:
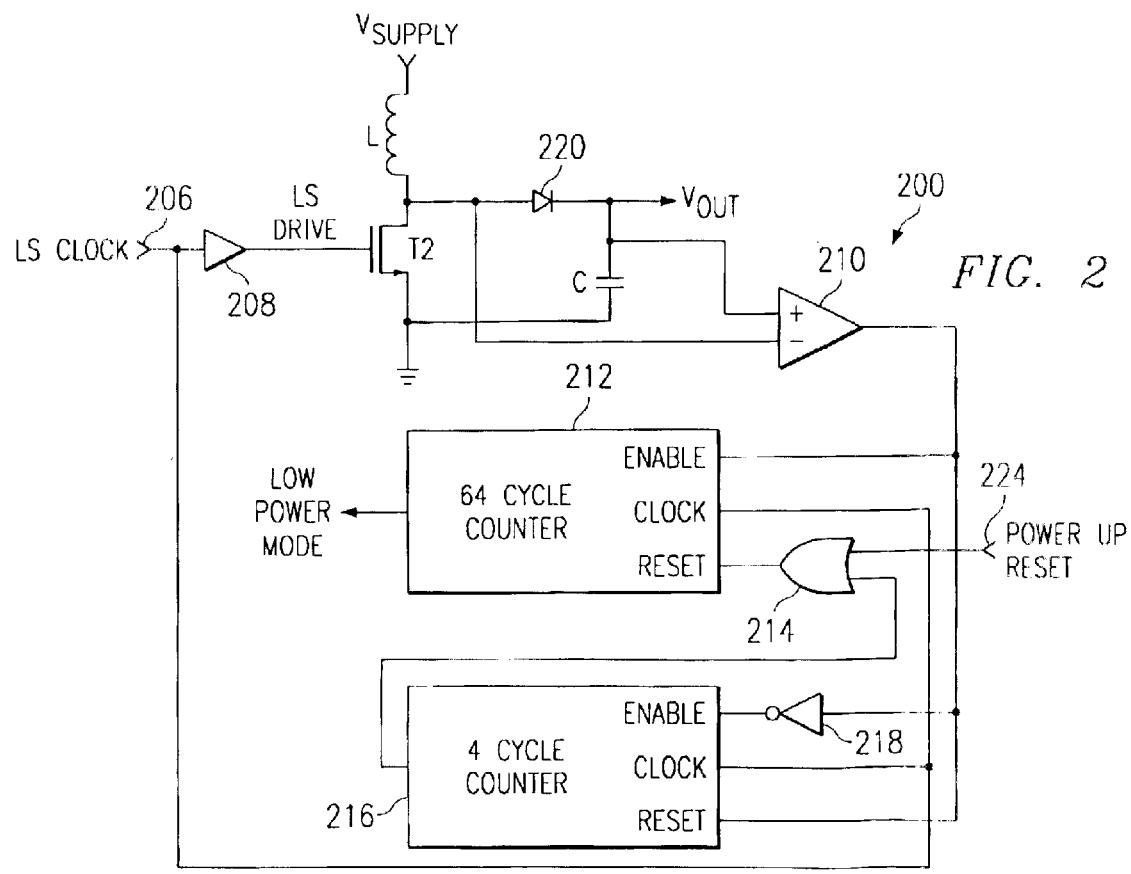
FIG. 2 is a schematic block diagram of a second embodiment of the invention as applied to a boost DC/DC converter.

Referring now to FIG. 2, a second embodiment of the invention as applied to a boost DC/DC converter is shown generally as 200. Elements of FIG. 2 that are similar to elements of FIG. 1 have similar reference characters. The DC/DC converter has an inductor L having one terminal coupled to a power $V_{supply}$ and a second terminal coupled to the source of an NMOS switching transistor T2. The drain of this transistor is coupled to ground. The node at the junction of the inductor L and the switching transistor T2 is connected to the cathode of diode 220, the anode of which is coupled to the terminal Vout. Across the anode of the diode 220 to ground is an output capacitor C. The transistor T2 is switched by a clock signal LS clock on terminal 206 via driver 208. In operation, switching transistor T2 is switched ON to draw current through the inductor to ground in order to generate a magnetic field within the inductor L. Then the transistor T2 is switched OFF causing magnetic field to reverse polarity and increase in voltage to try to maintain the current flow through the inductor L. This voltage is coupled via diode 220 to capacitor C. As is well know in the art, the voltage on capacitor C can be higher than the voltage provided by the current $V_{supply}$.

If the load current is sufficient, the current through the inductor will remain positive throughout both halves of the cycle and diode 220 will be forward biased during the entire second portion of the cycle. However, if the current falls below a threshold value, the current through the inductor will become discontinuous and diode 220 will be reversed biased by the voltage across the output capacitor C, which is higher than the voltage $V_{supply}$, and will therefore back bias the diode. A voltage detector or comparator 210 is coupled across the diode by having its non-inverting terminal coupled to $V_{out}$ and its inverting terminal coupled to the junction of the inductor and the low side switching transistor T2. In a situation in which the diode is back biased, the voltage at comparator 210 will be substantially the voltage across the output capacitor which will then produce a high level at the output of comparator 210. The output comparator of 210 is coupled to a 64-cycle counter 212, an OR gate 214, an inverter 218 and a 4-cycle counter 216 in the same manner as comparator 110, 64-cycle counter 112, OR gate 114, inverter 118 and 4-cycle counter 116 were connected in the embodiment shown in FIG. 1. The one difference between the two circuits is that the clock signal is the LS clock rather than the HS clock. The two counters will operate in the same manner as the discussed in the embodiment shown in FIG. 1 to produce a low power mode signal in the event that the diode remains reversed biased for 64 clock cycles.

Figure 3:
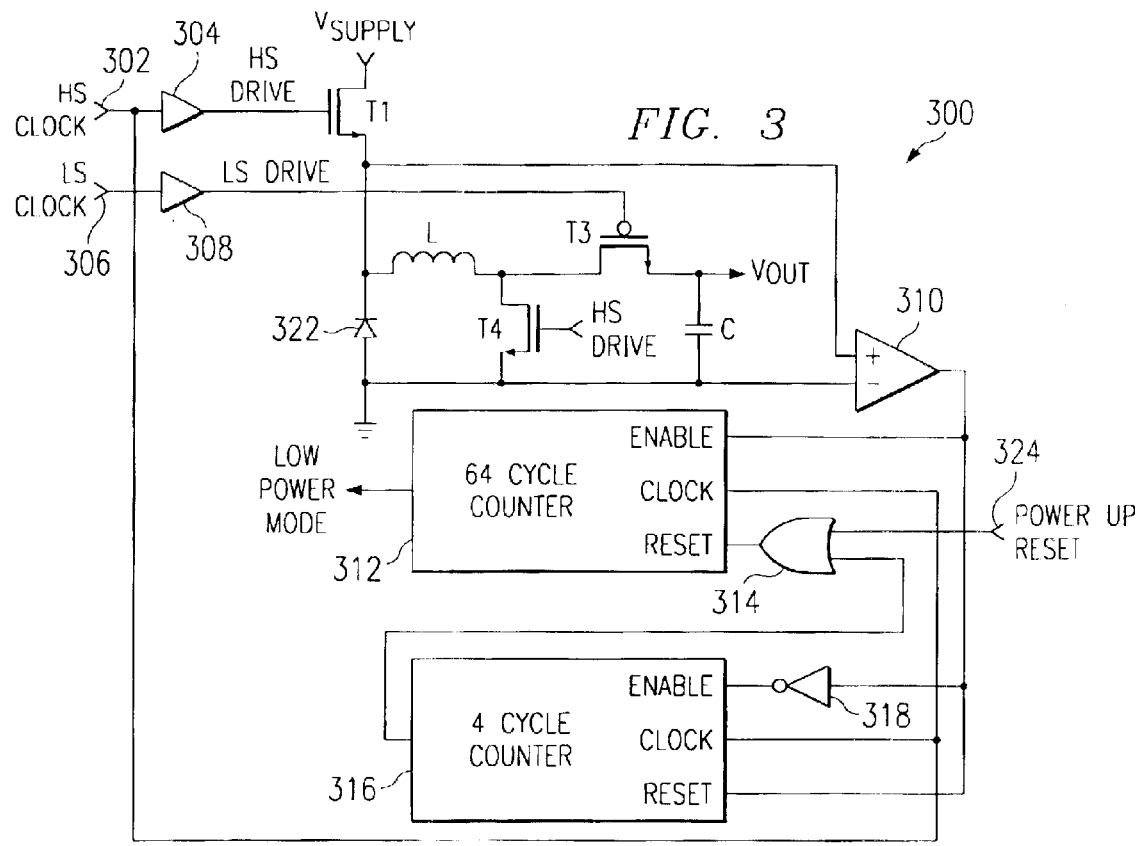
FIG. 3 is a schematic block diagram of a third embodiment of the invention applied to a buck/boost DC/DC converter.

Referring to FIG. 3, an embodiment of the present invention applied to a buck/boost converter is shown generally as 300. The converter has a switching transistor T1 having a source connected to a voltage supply $V_{supply}$ and a drain coupled to the junction of an inductor and a free wheeling diode 322. The gate of the transistor T1 is driven by the HS clock signal on terminal 302 by driver 304. Connected at the other terminal of the inductor L is a second switching transistor T4 having its source connected to the inductor and its drain connected to ground. The gate of transistor T4 is driven by the output of the driver 304. The junction of the inductor and transistor T4 is connected to the source of synchronous rectifier transistor T3. The drain of transistor T3 is connected to a first terminal of output capacitor C, which has its second terminal connected to ground. The voltage across the capacitor is the output voltage of the circuit.

The utilization of a diode such as diode 322 instead of a NMOS synchronous transistor, has certain advantages. It eliminates the need to build in guard rings around the NMOS transistor to avoid substrate injection, which results in a larger device. It is then possible to place the device off-chip as this requires no additional pins on the integrated circuit. Furthermore, it makes the detection of the discontinuous mode easy because the voltage across the diode 322 can be readily monitored. Problems with the utilization of the synchronous transistor can occur and these are discussed in connection with the embodiment of FIG. 4.

Comparator 310 is coupled across diode 322 having its non-inverting input coupled to the junction of transistor T1 and diode 322 and its inverting input coupled to ground. In operation, transistors T1 and T4 are turned on by the HS drive signal output from driver 304 in response to HS clock on terminal 302. One terminal of inductor L is thus coupled to $V_{supply}$ through transistor T1 and the other terminal is coupled to ground through the transistor T4. Thus, the voltage across the inductor will be the supply voltage $V_{supply}$ less the voltage drops across the transistors T1 and T4. At the end of the first portion of the cycle, transistors T1 and T4 are turned OFF, resulting the collapse of the magnetic field produced in the inductor L during the first portion of the cycle. Voltage across the inductor will reverse polarity and will generate a voltage which exceeds the voltages of $V_{supply}$. Transistor T3 is turned ON by the LS clock received on terminal 306 via buffer 308. With transistor T3 turned ON, current will flow from ground through diode 322 through the inductor L and transistor T3 to charge the capacitor C. As is known in the art, if the duty cycle of the device has transistors T1 and T4 ON for less than 50% of the cycle, the DC/DC converter of FIG. 3 acts as a buck DC/DC converter where as if the duty cycle exceeds 50%, the converter acts as a boost converter.

As long as the current in conductor L remains continuous, the diode 322 will be forward biased during the second portion of the cycle and the voltage across comparator 310 will be negative. If the current for inductor L becomes discontinuous, then at some portion in the cycle the diode 322 will not be forward biased and the voltage across capacitor C will reverse bias the diode via transistor T3 and inductor L. The resulting positive voltage across the diode will cause a positive output from comparator 310. The output of comparator 310 is coupled to a 64-cycle counter 312, OR gate 314, and inverter 318 and a 4-cycle counter 316 in the same manner as comparator 110, 64-cycle counter 112, OR gate 114, inverter 118 and 4-cycle counter 116 were connected in the embodiment shown in FIG. 1. The clock inputs to the two counters are connected to the HS clock at terminal 302 and this circuit operates in the same manner as discussed above in connection with FIG. 1 to produce a low power mode signal in the event that the diode 322 remains reversed biased for 64 clock cycles.

Figure 4:
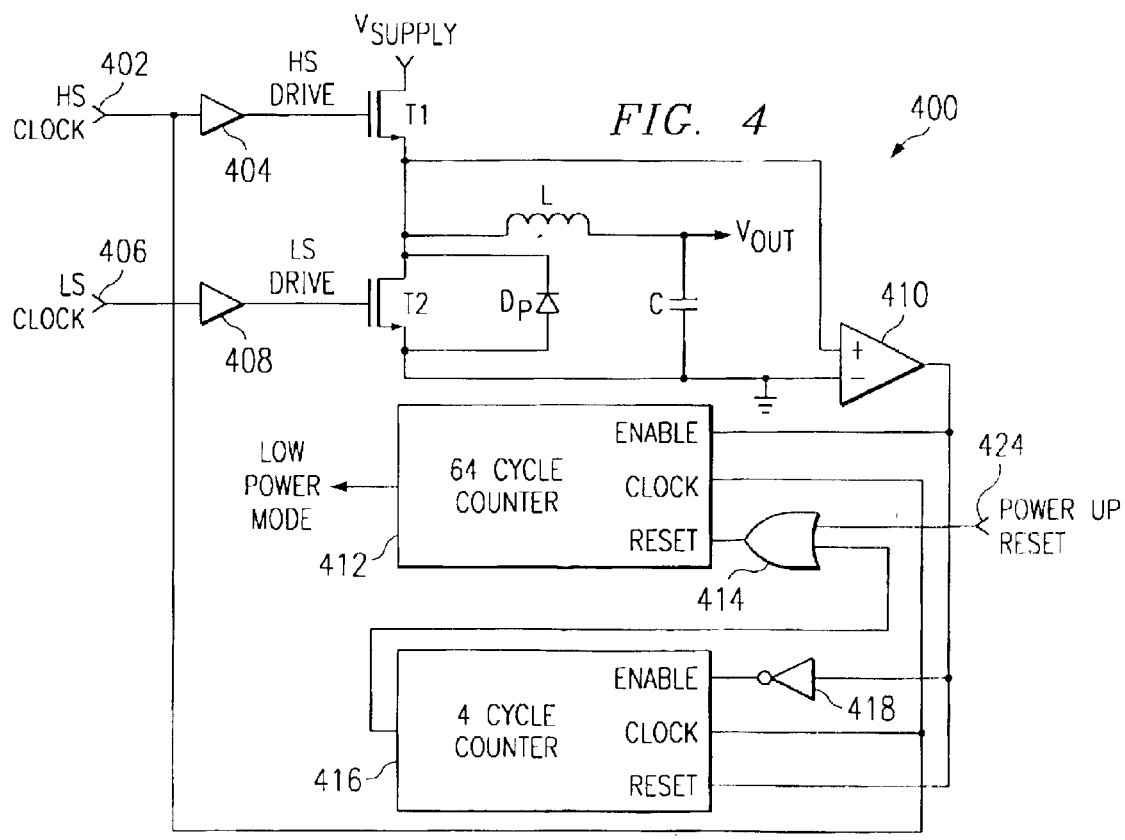
FIG. 4 is a schematic block diagram of a 4th embodiment of the invention applied to a buck DC/DC converter utilizing a synchronous rectifier.

Referring now to FIG. 4, an embodiment of the present invention applied to a buck converter utilizing a synchronous rectifier is generally shown as 400. The DC/DC converter 400 is identical to the configuration shown in FIG. 1 except for the substitution of the synchronous rectifier transistor T2 for the free wheeling diode 122. Thus, switching transistor T1 has its drain connected to a voltage source $V_{supply}$ and its source connected to a first terminal of inductor L. The second terminal of inductor L is connected to a first terminal of a capacitor C which has a second terminal connected to ground. The voltage across the capacitor C is the output voltage of the circuit. Transistor T1 is driven by driver 404 in response to HS clock which is applied to terminal 404. A second transistor T2 has its drain connected at the node formed between transistor T1 and inductor L and its source coupled to ground. Transistor T2 is driven by driver 408 in response to the LS clock applied to terminal 406. Clock signal LS is the inverse of clock signal HS. Both clock signals can be generated by a common clock generator (not shown). As is well know to those skilled in the art, it is necessary to prevent both transistors T1 and T2 from being on at the same time in order to avoid the "shoot through" or "crowbar" current that would flow through the short circuit. Accordingly one or both of the drivers 404, 408 have suitable delay circuitry incorporated therein to prevent this problem.

The formation of an MOS transistor results in the formation of a PN junction thus providing a parasitic diode $D_p$. These diodes also exist for the other transistors illustrated in this application, but are not shown as they serve no function except where illustrated herein. The circuit of FIG. 4 operates essentially the same as the circuit of FIG. 1 except that the transistor T2 is driven ON during the second portion of the cycle in order to provide the current flow path for the current generated by the collapsing magnetic field in the inductor L. As is well known, one of the primary sources of loss in a switching regulator is the loss due to the free wheeling diode 122. A synchronous rectifier transistor can provide the same function with a lower voltage drop, and thus substantially reduce this loss. As long as the circuit operates in continuous mode, there is essentially no difference in the operation between the circuit shown in FIG. 4 and in FIG. 1. However, if the current drops below the threshold necessary to prevent discontinuous operation, the current in the inductor will go to zero. In this case, the diode is bypassed by the conducting transistor T2. Thus, reverse current can flow from the capacitor C to ground through transistor T2. The reverse current causes the voltage across transistor T2 to go from negative, as with the diode 122, to positive thus enabling the voltage to be detected by comparator 410. If the transistor T2 has been chosen to have a sufficiently low resistance, the voltage generated across the transistor by the reverse current may be very small and may be within the offset of comparator 410. It would then be necessary to use a low-offset comparator which would add to the cost of the circuit.

However, if the invention disclosed in co-pending application Ser. No. 10/270,921 filed even date herewith and incorporated herein by reference is utilized, the detection of the voltage across the transistor T2 can be more easily accomplished. In that application, a current sensing circuit is provided which detects when the current drops below a predetermined threshold. At this point, the current needed to drive transistor T2 may exceed the output current, thus the improvement in efficiency provided by utilizing the synchronous rectifier transistor actually results in the circuit utilizing more current. Under these circumstances, the generation of the drive signal for transistor T2 is disabled and the drive current is saved. When transistor T2 is turned OFF, the parasitic diode $D_p$ now functions as the free wheeling diode such as diode 122 in FIG. 1. The threshold at which transistor T2 is turned OFF may be higher that the threshold below which discontinuous current flows. Therefore, if transistor T2 is turned OFF, the voltage that has been detected by comparator 410 when in discontinuous current flow is present, now becomes the voltage across a diode, and the circuit will function the same as the circuit shown in FIG. 1. The output of comparator 410 is coupled to 64-cycle counter 412, OR gate 414, inverter 418, and 4-cycle counter 416 in the same manner as comparator 110, 64-cycle counter 112, OR gate 114, inverter 118 and 4-cycle counter 116 are connected in the embodiment shown in FIG. 1 to produce a low power mode signal in the event that the polarity of the voltage across the synchronous rectifier T2 indicates that reverse current is possible. If the synchronous rectifier is turned OFF, the low power mode signal is produced when the voltage across the free wheeling diode $D_p$ is appropriate for reverse current flow.

Figure 5:
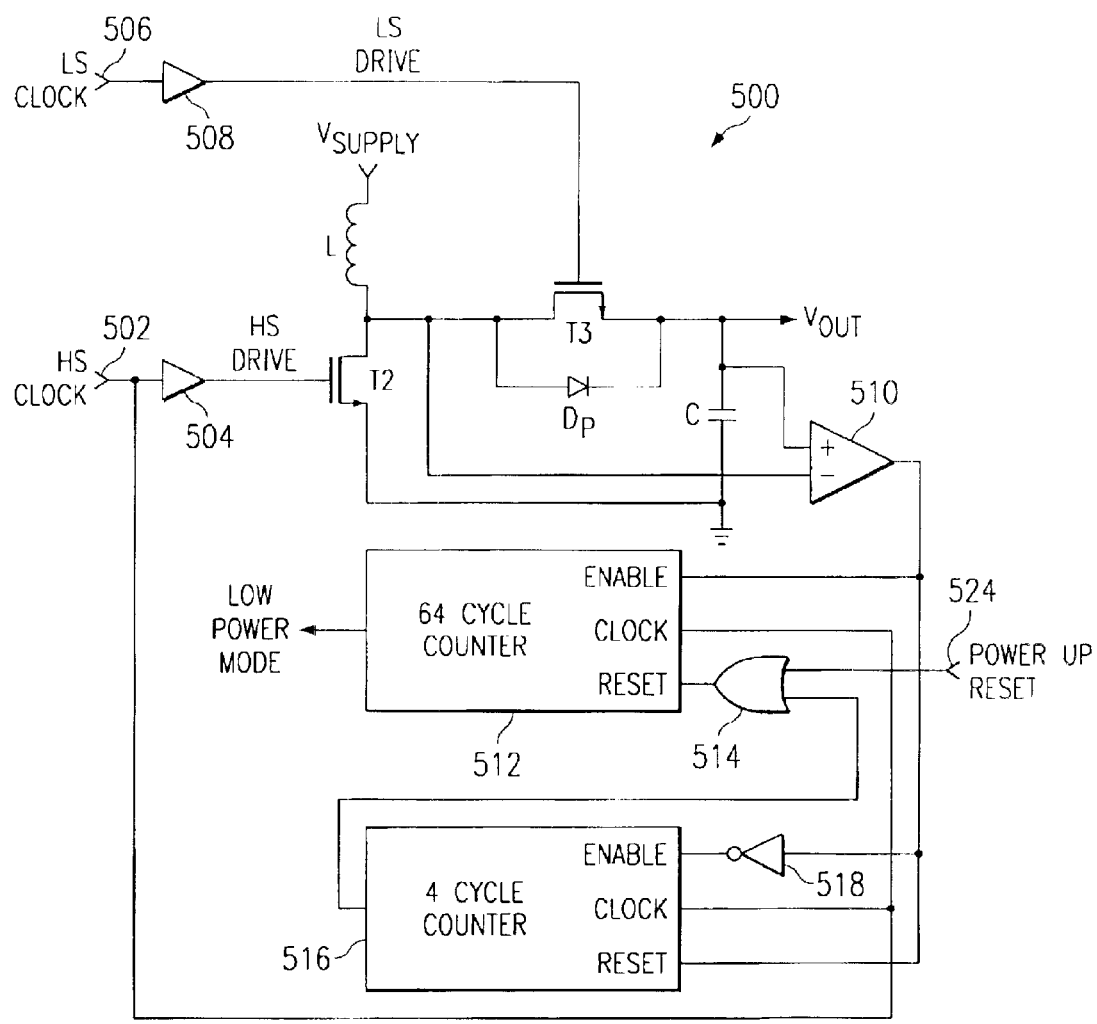
FIG. 5 is a fifth embodiment of the invention applied to a boost DC/DC converter utilizing a synchronous rectifier.

Referring now to FIG. 5, an embodiment of the present invention applied to a boost regulator utilizing a synchronous rectifier is generally shown as 500. DC/DC converter 500 is identical to the configuration shown in FIG. 2, except for the substitution of the synchronous rectifier transistor T3 for the free wheeling diode 220. Thus, one terminal of inductor L is coupled to the voltage supply $V_{supply}$ and the second terminal is coupled to the drain of switching transistor T2. The source of transistor T2 is connected to ground. The gate of transistor T2 is connected to driver 504 which drives transistor T2 in response to the HS clock applied to terminal 502. The drain of transistor T2 is also coupled to the drain of transistor T3 the source of which is coupled to the output terminal of the converter. Transistor T3 is driven by the LS drive circuit 508 which drives transistor T3 in response to the LS clock signal on terminal 506. A parasitic diode $D_p$ is in parallel with transistor T3. The source of transistor T3 is coupled to one terminal of output capacitor C the other terminal of which is coupled to ground. A comparator 510 has its non-inverting input coupled to the output terminal of the converter and has its inverting input coupled to the junction of transistors T2 and T3. When the circuit is operating in the continuous mode, there is a continuous flow of current from $V_{supply}$ through inductor L and transistor T3 during the second portion of the cycle when transistor T2 is OFF. Thus, the presence of parasitic diode $D_p$ is irrelevant. However, if the current through the inductor drops below the threshold necessary to prevent discontinuous operation, the current in the inductor will go zero. In this case, it is possible for current to flow from the capacitor C through the transistor T3 and back to the supply through inductor L because the output voltage exceeds $V_{supply}$. The reverse current causes the voltage across the transistor T3 to go negative, which will be sensed by comparator 510. The same problems discussed above in connection with embodiment of FIG. 4 applies here. Therefore, if the invention disclosed in the co-pending application Ser. No. 10/270,921 filed even date herewith is utilized, it will be easier and less expensive to detect the voltage across the synchronous rectifier because the output voltage across capacitor C will back bias the diode $D_p$ and transistor T3 will be OFF. The output of comparator 510 is coupled to 64-cycle counter 512, OR gate 514, and 4-cycle counter 516 in the same manner as comparator 110, 64-cycle counter 112, OR gate 114, inverter 118 and 4-cycle 116 are connected in the embodiment shown in FIG. 1 to produce a low power mode signal in the event that the polarity of the voltage across the synchronous rectifier T3 indicates that reverse current is possible. If the synchronous rectifier is turned OFF, the low power mode signal is produced when the voltage across the free wheeling diode $D_p$ is appropriate for reverse current flow.

Figure 6:
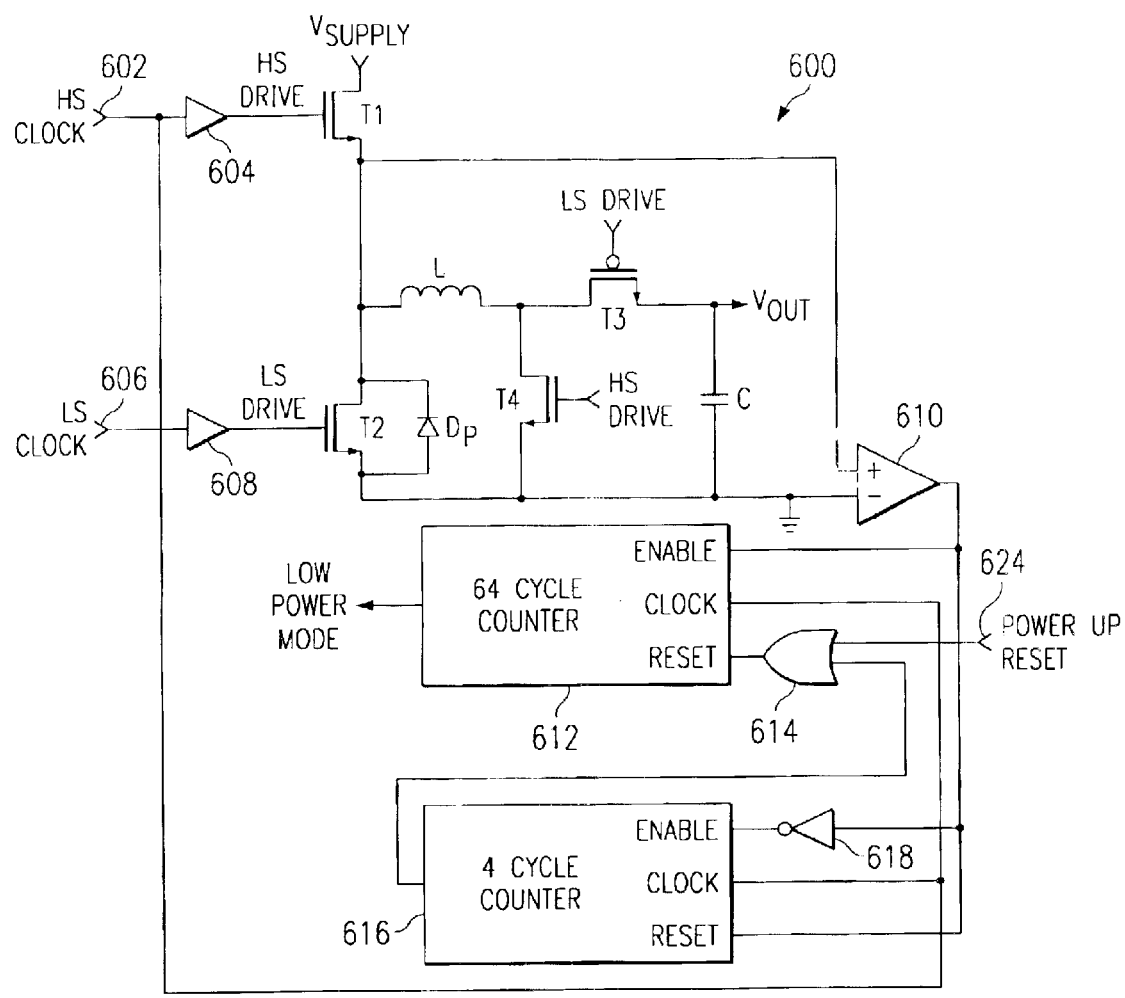
FIG. 6 is a sixth embodiment of the invention applied to a buck/boost DC/DC converter utilizing a synchronous rectifier.

Referring to now to FIG. 6, an embodiment of the present invention applied to a buck/boost converter utilizing a synchronous rectifier is generally shown as 600. The DC/DC converter 600 is identical to the configuration shown in FIG. 3 except for the substitution of synchronous rectifier transistor T2 for the free wheeling diode 322. Thus, switching transistor T1 has its drain connected to a voltage source $V_{supply}$ and its source connected to the first terminal of inductor L. Also connected to the first terminal of inductor L is the drain of a switching transistor T2 which has its source connected to ground. The gate of transistor T1 is connected to driver 604 which is responsive to the HS clock on terminal 602 to drive the gate of transistor T1. The gate of transistor T2 is connected to the driver 608 which is responsible to the LS clock applied to terminal 606 to drive the gate of transistor T2. The second terminal of inductor L is connected to the drains of transistor T3 and T4. The source of transistor T3 is coupled to the output of the converter. The source of transistor T4 is connected to ground. Transistor T3 is driven from LS drive which is the output of driver 608 and transistor T4 is connected to the HS drive which is the output of driver 604. A capacitor C is connected between the source of transistor T3 and ground. As in the embodiment of FIG. 4, one or both of the drivers 604, 608 have suitable delay circuitry incorporated therein to prevent "shoot through" or "crowbar" current. In addition, transistor T2 has a parasitic diode Dp coupled across the transistor. The circuit of FIG. 6 operates essentially the same as the circuit of FIG. 3 except that the transistor T2 is driven ON during the second portion of the cycle in order to provide the current flow path for the current generated by collapsing magnetic field in the inductor L. As long as the circuit operates in the continuous mode, there is essentially no difference in the operation in the circuit shown as FIG. 6 and FIG. 3. However, if the current drops below the threshold necessary to prevent discontinuous operation, the current in the inductor will go to zero. In this case, the diode is bypassed by the conducting transistor T2. This reverse current can flow from the capacitor C to ground through inductor L and transistor T2. The reverse current causes the voltage across transistor T2 to go from negative, as with the diode 322, to positive thus enabling the voltage to be detected by comparator 610. Comparator 610 has a non-inverting terminal coupled to the junction of transistor T1 and T2 and inverting terminal coupled to ground. As with the circuit of FIG. 4, if transistor T2 has been chosen to have a sufficiently low resistance, the voltage generated across the transistor by the reverse current may be very small and may be within the offset of comparator 610. It would then be necessary to use a low-offset comparator which would add to the cost of the circuit. Another solution is to use the invention disclosed in co-pending application Ser. No. 10/270,921 filed even date herewith) in which transistor T2 would be turned OFF. When transistor T2 is turned OFF, the voltage that has been detected by comparator 610 when discontinuous current flow present, now becomes the voltage across the parasitic diode $D_p$ and the circuit will function the same as show in FIG. 3. This allow a less expensive comparator to be utilized.

The output of comparator 610 is coupled to 64-cycle counter 612, OR gate 614, inverter 618 and 4-cycle counter 616 in the same manner as comparator 110, 64-cycle counter 112, OR gate 114, inverter 118 and 4-cycle counter 116 are connected in the embodiment shown in FIG. 1, to produce a low power mode signal in the event that the polarity of the voltage across the synchronous rectifier T2 indicates that reverse current is possible. If the synchronous rectifier is turned OFF, the low power mode signal is produced on the voltage across the free wheeling diode $D_p$ is appropriate for reverse current flow.

While the invention has been particularly shown and described with reference to preferred embodiments thereof, is well understood by those skilled in the art and various changes and modifications can be made in the invention without departing from the spirit and the scope of the invention as defined by the appended claims. For example, although the invention has been illustrated utilizing transistors of one particular polarity type, it is well known in the art that transistors of the opposite polarity type can also be utilized. Furthermore, the detection that the converter is in a steady state mode can be established by circuits other than utilization of the 64-cycle and 4-cycle counters shown herein without departing from the invention. In addition, the number of cycles in the two counters is a design choice and not critical to the function of the invention.

What is claimed is:

1. In a voltage converter comprising a semiconductor switch coupled to an inductor, a capacitor and a rectifier, voltage across the capacitor being an output voltage, a control circuit placing the voltage converter in a reduced power mode comprising:

a voltage detector circuit coupled across the rectifier detecting polarity of a voltage across the rectifier and generating a control signal to place the voltage converter in a low power mode when the polarity of the voltage across the rectifier is an appropriate polarity for reverse current flow; and a timing circuit coupled to an output of the voltage detector, the timing circuit delaying the generation of the control signal until a predetermined number of clock cycles has elapsed, whereby the voltage converter is placed in a low power mode only when steady state current is below a predetermined threshold.

2. The circuit of claim 1 wherein the rectifier is a synchronous rectifier transistor, the semiconductor switch and the synchronous rectifier being alternatively driven between ON and OFF states by a control circuit.

3. The circuit of claim 2 wherein the synchronous rectifier is an FET transistor having a parasitic diode formed therein, the parasitic diode operating as a free wheeling diode when the synchronous rectifier FET is disabled.

4. The circuit of claim 1 wherein the voltage converter is a buck DC/DC converter.

5. The circuit of claim 1 wherein the voltage converter is a boost converter.

6. The circuit of claim 1 wherein the voltage converter is a buck/boost converter.

7. The circuit of claim 1 wherein the voltage detector circuit comprises a voltage comparator which generates a logic signal when the voltage across the rectifier is of opposite polarity from the voltage across the rectifier during full load operation.

8. A DC/DC converter for generating a voltage at an output which is lower than a voltage supplied to an input comprising:

an NMOS transistor coupled between the voltage supply and the series connection of an inductor and a capacitor, voltage across the capacitor being the output voltage;

an NMOS synchronous rectifier transistor connected in parallel to the series connected inductor and capacitor, the synchronous rectifier having a parasitic diode coupled in parallel thereto;

a control circuit coupled to the NMOS transistor and the NMOS synchronous rectifier transistor and providing a drive signal between substantially the supply voltage and substantially a reference voltage; and a voltage detector circuit coupled across the NMOS synchronous rectifier transistor detecting polarity of a voltage across the NMOS synchronous rectifier transistor and generating a control signal to place the converter in a low power mode when the polarity across the synchronous rectifier indicates that reverse current flow is possible; and a timing circuit coupled to an output of the voltage detector, the timing circuit delaying the generation of the control signal until a predetermined number of clock cycles has elapsed, whereby the voltage converter is placed in a low power mode only when steady state current is below a predetermined threshold.

9. A method for operating a voltage converter having a semiconductor switch coupled to an inductor, a capacitor and a rectifier, comprising:

detecting voltage polarity across the rectifier and comparing it to polarity at full load;

generating a control signal if the polarity detected is opposite the polarity at full load;

placing the converter in a low power mode; and counting a number of clock cycles during which the polarity must remain opposite that of full load current, and generating the control signal only if the polarity remains opposite of full load current for a predetermined number of clock cycles.

10. A voltage converter comprising:

a first switching transistor coupled to a first voltage supply, an inductor, and a capacitor, voltage across the capacitor being an output voltage;

a rectifier coupled to the inductor to allow a collapse of the magnetic field of the inductor to charge the capacitor;

a voltage comparator coupled across the rectifier and detecting a polarity of voltage across the rectifier;

a control circuit responsive to an output of the voltage comparator indicative of a polarity reversal across the rectifier during the decay of the inductor magnetic field, to generate a control signal which places the voltage converter in a low power mode; and to a timing circuit coupled to an output of the voltage detector, the timing circuit delaying the generation of the control signal until a predetermined number of clock cycles has elapsed, whereby the voltage converter is placed in a low power mode only when steady state circuit is below a predetermined threshold.

11. The circuit of claim 10 wherein the rectifier is a synchronous rectifier transistor, the semiconductor switch and the synchronous rectifier being alternatively driven between ON and OFF states by a control circuit.

12. The circuit of claim 10 wherein the control circuit includes a low current detector circuit, the control circuit disabling the synchronous rectifier during operation below a predetermined current threshold.

13. The circuit of claim 10 wherein the synchronous rectifier is an FET transistor having a parasitic diode formed therein, the parasitic diode operating as a free wheeling diode when the synchronous rectifier FET is disabled.

14. The circuit of claim 10 wherein the voltage converter is a buck DC/DC converter.

15. The circuit of claim 10 wherein the voltage converter is a boost converter.

16. The circuit of claim 10 wherein the voltage converter is a buck/boost converter.

17. The circuit of claim 10 wherein the voltage detector circuit comprises a voltage comparator which generates a logic signal when the voltage across the rectifier is of opposite polarity from the voltage across the rectifier during full load operation.

* * * * *